United States Patent [19]

Chisum

[11] 4,354,544

[45] * Oct. 19, 1982

[54] TIRE BEAD DEMOUNTING TOOL

[76] Inventor: Finis L. Chisum, P.O. Box 1145, Claremore, Okla. 74017

[*] Notice: The portion of the term of this patent subsequent to Mar. 17, 1998, has been disclaimed.

[21] Appl. No.: 159,212

[22] Filed: Jun. 13, 1980

Related U.S. Application Data

[63] Continuation-in-part of Ser. No. 958,106, Nov. 6, 1978, Pat. No. 4,256,161.

[51] Int. Cl.³ .............................................. B60C 25/06
[52] U.S. Cl. ................................................. 157/1.17
[58] Field of Search .................... 157/1.1, 1.17; 81/470

[56] References Cited

U.S. PATENT DOCUMENTS

| | | | |
|---|---|---|---|
| 2,292,146 | 8/1942 | Meunier | 81/470 |
| 2,901,029 | 8/1959 | Mraz | 157/1.17 |
| 3,038,510 | 6/1962 | Vorkoeper et al. | 157/1.17 |
| 3,505,928 | 4/1970 | Whitehouse | 81/470 X |
| 3,771,580 | 11/1973 | Branick | 157/1.17 |
| 3,847,197 | 11/1974 | Konen | 157/1.17 |

FOREIGN PATENT DOCUMENTS

1058360  3/1954  France ............................... 157/1.17

*Primary Examiner*—James G. Smith
*Attorney, Agent, or Firm*—Head, Johnson & Stevenson

[57] ABSTRACT

An improved tool for breaking the circumferential bead of a pneumatic tire from the inner surface of the lip of a wheel rim, the tool having a body with a forward downwardly extending rim engaging body tooth, a bead head slidably supported by the body, an arm pivotally supported to the body having an outer end configured to engage the exterior surface of the wheel rim, an arm actuator slidably supported by the body, and apparatus for longitudinally sliding the arm actuator to first pivot the arm to clamp the wheel rim lip and subsequently advancing the bead head to engage the tire and force the bead away from the wheel rim lip. The improvement lies in the method of clamping the wheel rim between the body tooth and the arm with a selected maximum value of force.

7 Claims, 11 Drawing Figures

TIRE BEAD DEMOUNTING TOOL

CROSS-REFERENCE TO RELATED APPLICATION

This application is a continuation-in-part of my co-pending application Ser. No. 958,106, filed Nov. 6, 1978, entitled: Tire Bead Demounting Tool, now U.S. Pat. No. 4,256,161.

BACKGROUND AND OBJECTS OF THE INVENTION

When it is necessary to remove a pneumatic tire from a wheel a difficult problem is breaking the tire bead away from the circumferential wheel rim lip. This problem is especially difficult with tubeless tires since an air-tight seal must be provided between the circumferential bead and the rim. Others have provided apparatus for accomplishing this objective, but most of the devices available on the market today are relatively expensive, are difficult to handle, and require a large number of working parts. The present invention is directed towards a simplified device for breaking the bead of a tire from the lip of a wheel rim which employs a minimum number of working parts and which utilizes a single actuating cylinder to provide the motive force for both the clamping of the device to the wheel rim and for breaking the tire bead from the rim.

It is therefore an object of this invention to provide an improved tire bead demounting tool.

A more particular object of the invention is to provide a tool for breaking the bead of a pneumatic tire from the lip of a rim in which the tool is actuated to both grasp the rim and subsequently move the tire bead and sidewall away from the rim utilizing a single actuating mechanism and a single control.

These general objects as well as other and more specific objects of the invention will be fulfilled in the following description and claims, taken in conjunction with the attached drawings.

SUMMARY OF THE INVENTION

A tool for breaking the circumferential bead of a pneumatic tire from the lip of a wheel rim. The tool includes a body having a forward end defining an integral downwardly extending rim engaging tooth. A cylinder is supported to the body or is formed as a part of the body, the cylinder having a piston rod reciprocally extending therefrom in a direction towards the forward end of the body. The bead head is reciprocally supported on the body and is coaxially displaced by the piston rod extending from the cylinder. The bead head has a forward end configured to engage the bead and sidewall of a tire. An arm is pivotally affixed at one end to the body and the other end of the arm extends to engage the outer surface of the wheel rim lip at a point opposite the rim engaging tooth. An arm actuator is slidably supported by the body and positioned by the piston rod and has an inclined upper surface which is sloped upwardly and rearwardly. A yoke is received by the body, the upper end of which engages the inclined surface of the arm actuator. The lower end of the yoke is attached to the arm. As the piston rod advances, it first moves the arm actuator to raise the yoke and thereby the arm affixed to it to engage the lower surface of the rim and clamp the rim lip between the arm and the downwardly extending rim engaging tooth. Subsequent to this clamping action, further advancement of the piston rod moves the bead head forwardly to engage the tire bead and sidewall and to push it inwardly away from the rim lip. Thus, the invention provides an apparatus wherein a single actuating device serves to sequentially grasp the rim of the wheel and subsequently push the tire bead and sidewall away from the rim lip.

DETAILED DESCRIPTION

The principal invention of this application comprises an improved design of the yoke which extends upwardly on both sides of the body and is attached at its bottom end to the arm, which in conjunction with the rim engaging tooth, holds the tool to the wheel rim.

While the copending application Ser. No. 958,106 provides full details of the tool, it is felt that some detail of the tool itself should be included directly into this application, to fully illustrate how this invention is related to the tool of Ser. No. 958,106.

Figure 1:
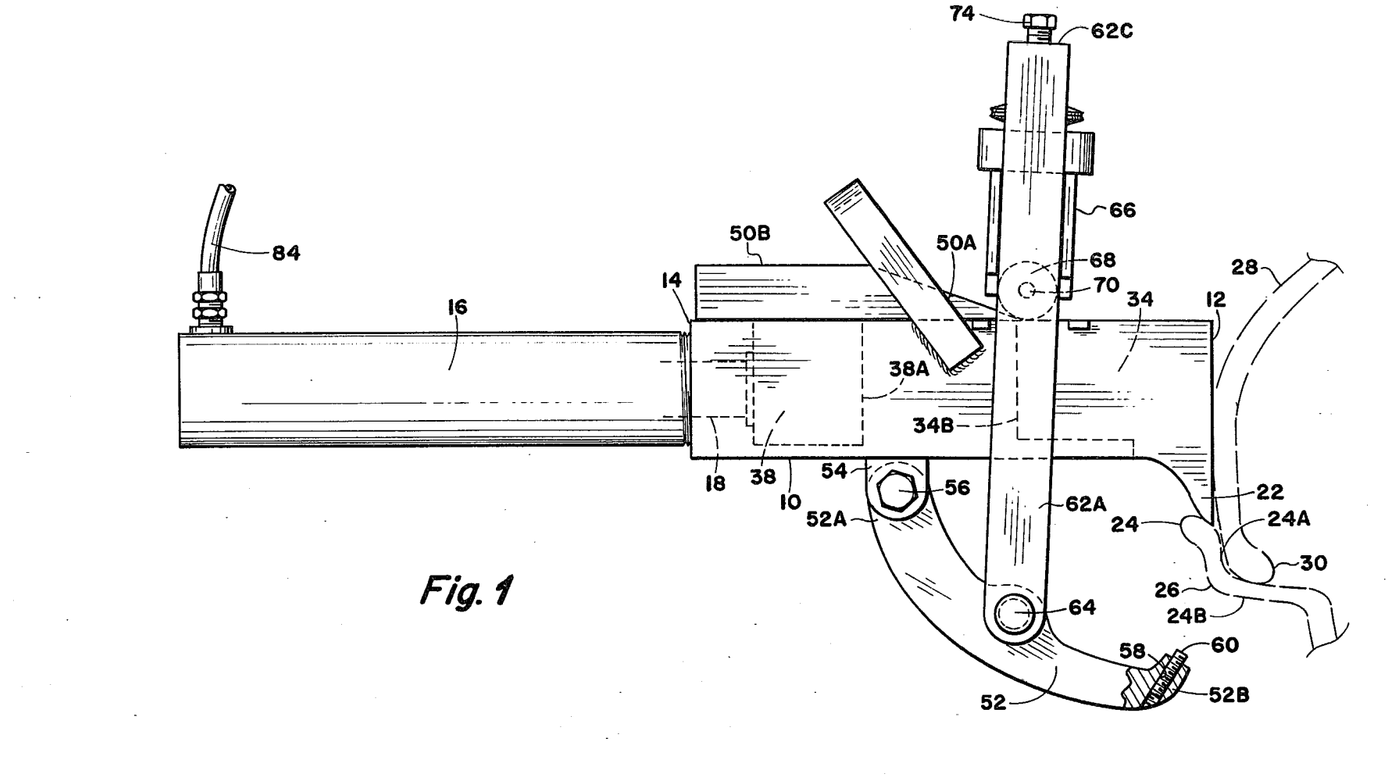
FIGS. 1, 2 and 3 are substantial duplicates of FIGS. 1, 3 and 4 respectively of application Serial No. 958,106.
Figure 2:
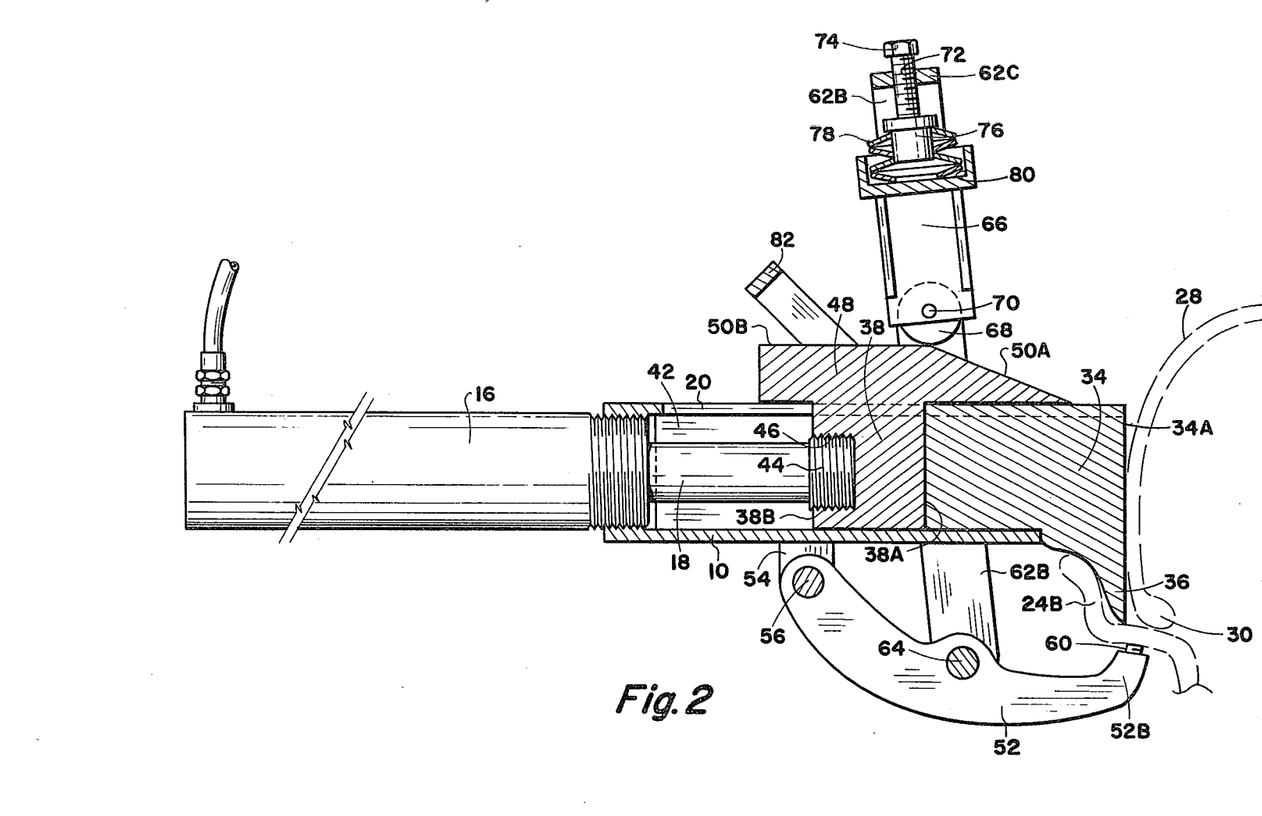
Figure 3:
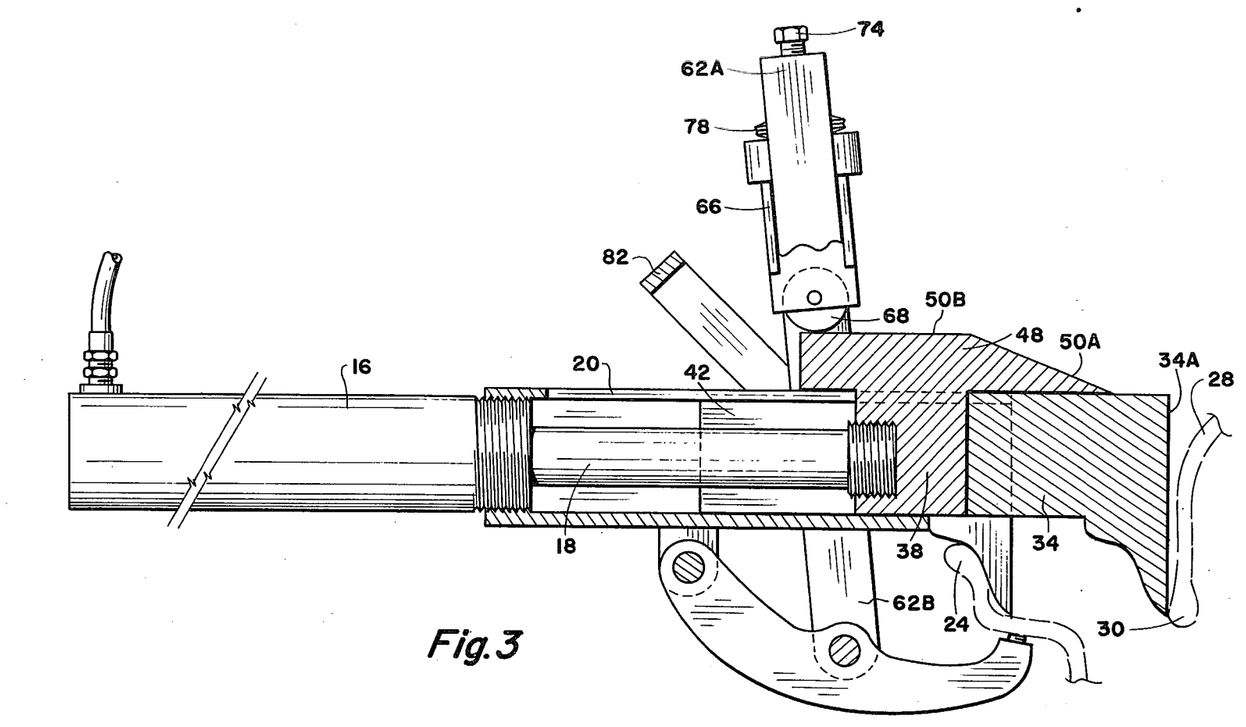

Consequently, FIGS. 1, 3 and 4 of Ser. No. 958,106 are included in this application as FIGS. 1, 2, and 3 respectively, and will now be described.

Referring now to the drawings and in particular to FIGS. 1, 2 and 3, an apparatus which embodies the invention is illustrated. The apparatus includes a body 10 which has a forward end 12 and a rearward end 14. Attached to the body rearward end 14 is a hydraulic or pneumatic cylinder 16 which has a piston rod 18. Cylinder 16 may be integrally formed as a part of body 10. Body 10 is hollow in part and includes a slot in the upper surface.

The front surface 12 of body 10 includes an integral downwardly extending tooth projection 22 which is designed to extend down over the top edge of the lip 24 of a wheel rim 26. The rim lip 24 has an inner surface 24A and an outer surface 24B. A tire 28 is mounted on rim 26 having a bead 30 which engages the wheel lip inner surface 24A. The function of the tool of this invention is to move the bead 30 away from engagement with the wheel rim lip 24.

The body 10 is hollow, or, in other words, has a longitudinal recess therein which extends through to the front forward end 12. Slidably positioned within this recess is a bead head 34 having a forward face 34A. In the retracted position of bead head 34, the face 34A is planar with the body forward end 12. The bead head forward end includes an integral downwardly extending tooth 36 which matches the tooth 22 of body 10, which, in the construction illustrated, is in the form of two spaced apart portions separated by the recess. FIGS. 1 and 2 show the bead head 34 in the fully withdrawn position within body 10.

An arm actuator 38 is also slidably positioned within recess 32 of body 10, rearwardly of bead head 34. In the illustrated arrangement, the bead head 34 includes opposed wing portions 42 which extend rearwardly from the rearward surface 34B of the bead head. The wing portions 42 are spaced apart providing a recess therebetween which slidably receives the arm actuator 38. Piston rod 18 has a threaded outer end 44 which is threadably received in a threaded recess 46 in the arm actuator surface 38B. Thus the position of arm actuator 38 is controlled by cylinder 16.

Arm actuator 38 has an upwardly extending integral portion 48 which extends above body 10 through slot 20. The upper portion 48 defines an upper surface having a forward inclined portion 50A and a rearward straight surface 50B which is in a plane parallel the axis of the piston rod 18.

Pivoted to body 10 is an arm 52. The inner end 52A is pivotally attached to a bracket 54 extending from body 10, the arm pivoting about pin 56. The arm outer end 52B is configured to engage the outer surface 24B of the wheel rim lip. To enhance the gripping action of the arm outer end 52B, a threaded recess 50A is provided in the arm which receives a screw 60.

Arm 52 is controlled by a yoke which consists of opposed yoke portions 62A and 62B connected at the top with top portion 62C. The lower ends of the yoke portions 62A and 62B receive a pin 64 which extends through the middle portion of arm 52.

Slidably received between the yoke portions 62A and 62B above body 10 is a carriage 66 which supports, at the lower end thereof, a roller 68, the roller being rotatable about pin 70. The roller 68 engages the arm actuator upper surface 50A and 50B. The yoke top portion 62C has a threaded opening 72 receiving bolt 74. The lower end of bolt 74 receives a cylindrical collar 76 which engages a stack of cup-shaped compression washers 78. The upper end of carriage 68 has a cylindrical recess 80 which also receives compression washers 78. By threaded adjustment of bolt 74, the angle of pivotation of arm 52 is controlled and the compression washers 78 function like a compression spring.

To aid in the handling of the tool, a handle 82 in the form of a U-shaped member has the lower ends affixed to body 10. Obviously the handle as well as other features of the invention may be arranged in a variety of different ways.

Cylinder 16 is supplied by hydraulic or pneumatic pressure through a hose 84 which leads to a source of hydraulic or pneumatic pressure controlled by a valve (not shown), which may be in the form of a foot-operated valve so that the operator may have both hands free when utilizing the device.

OPERATION

To break the bead 30 of a tire from the wheel rim lip 24, the tool is first positioned adjacent the sidewall of tire 28 with the tooth 22 resting upon the rim lip 24 against the tire sidewall. Piston rod 18 is fully withdrawn, all as shown in FIG. 1. The operator then actuates a control valve, which may be, as previously indicated, a foot-operated valve (not shown) to apply fluid pressure to cylinder 16 to advance piston rod 18. As the rod moves forward, arm actuator 38 is axially forwardly advanced. The inclined surface 50A of the arm actuator moves against the roller 68, moving the yoke upwardly and thereby pivoting arm 52 upwardly towards the position as shown in FIG. 2. This moves the arm outer end 52B into contact with the rim lip outer surface 24B and pulls the forward end 12 of body 10 and the forward end of the bead head downwardly between the outer surface of the tire bead 30 and the interior surface 24A of the rim lip, and by this action, the tool is securely fastened to the rim lip, as shown in FIG. 2.

Further axial advance of piston rod 18A causes the arm actuator forward surface 38A to engage the rearward surface 34B of bead head 34. Subsequent forward advancement of the rod moves the bead head 34 forwardly towards the position as shown in FIG. 3. This forward movement causes the bead head forward surface 34A to push the sidewall and bead 30 of tire 28 away from engagement with wheel rim lip 24. It can be seen that as the bead head 34 is moved axially forward, the planar surface 50B on the top of the arm actuator upper portion 48 maintains tension on the yoke and arm 52. The amount of tension applied by arm 52 is regulated by bolt 74 and the compression washers 78.

As the piston rod 18 is withdrawn, which may be accomplished either by a spring internally of the cylinder 16 (not shown) or by the use of a double acting cylinder (not shown), the bead head 34 is withdrawn and tension applied by arm 52 is released so that the device is disengageable from the rim.

An important feature of the device of this invention is the arrangement wherein a single force applied by a hydraulic cylinder advancing a piston rod serves not only to clamp the tool to a wheel rim, but to simultaneously, with the subsequent forward motion of the piston rod, break the bead of a tire from the wheel rim lip. Thus, the operator needs only one control actuation to expeditiously cause the tool to attach to the rim followed by breaking the bead from the wheel rim lip.

The function of the apparatus is simple and straightforward, utilizing a minimum number of components. It can be seen that the actual configuration of the tool which employs the principle of this invention may change in many respects. The arrangement of the yoke arms 62A and 62B, the arrangement of carriage 66 with its roller 68, the means of utilizing spring action such as exemplified by compression washer 68 all may vary considerably in actual design. In addition, the shape of the arm actuator and the bead head may vary considerably as well as the configuration of body 10, all while nevertheless maintaining the same principle of operation of the invention.

In my copending application Serial No. 958,106, I have provided a compressional spring between the yoke and the roller in contact with the arm actuator. It has been found that under certain conditions, with the specific shapes of different wheel rims that the compressional spring requires frequent readjustments so as not to provide too great a force clamping the wheel rim between the downwardly extending tooth and the forward end of the rim.

In this invention and as indicated as shown in FIGS. 4, 4A, 5, 6, 7, 8, 9 and 10 a new and improved manner of controlling the force applied to the arm has been illustrated. In general this is a hydraulic apparatus, which provides a selected constant maximum force between the yoke and the roller and thus between the rim engaging tooth and the lower arm, which engages the wheel rim on the outside.

Figures 4, 4A, 5:
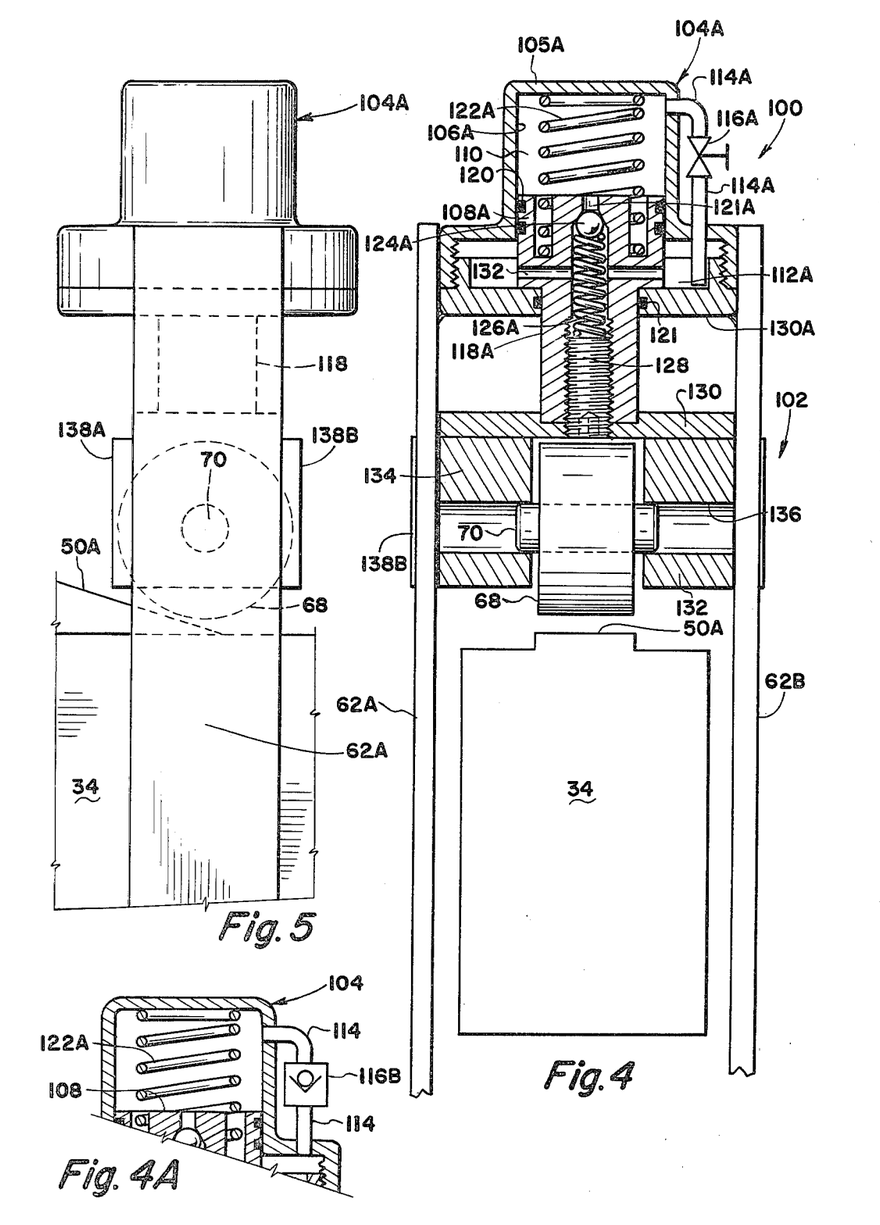
FIGS. 4, 4A and 5 show in two views and a detail, an improved design of the apparatus for holding the tool of this invention to the wheel rim.

Referring now to FIGS. 4, 4A and 5 there is shown a portion of the apparatus described in its entirety in FIGS. 1, 2 and 3. This portion represents the upper portion of the yoke which ties the lower arm to the roller, which is engaged by the arm actuator.

The objective of this apparatus is to provide a selectable maximum force by means of which the downwardly projecting tooth on the body of this device, which engages the inside of the lip of the wheel rim, and the forward end of the arm which engages the outside of the wheel rim. This force will draw the tooth down inside the rim between the rim lip and the tire bead, until the tooth presses on the inside of the wheel rim. In this position with a suitable force pressing these two parts together, the apparatus is held securely to the wheel rim so that with further engagement of the hydraulic fluid in the cylinder driving the piston forward, the piston eventually reaches the bead head and pushes this forward, thus breaking the bead away from the wheel rim, over a portion of the wheel rim.

In the drawings the body 10 is shown schematically with the two arms 62A and 62B of the yoke on opposite sides of the body, and fastened together by means of a connecting element which could be the bar 62C of FIG. 1, or as in this case, the hydraulic device which is to control the force by which the upward movement of the roller 68 in the sliding carriage 102, is resisted.

Indicated generally by the numeral 100 is the hydraulic device. It is positioned between the two downwardly extending arms 62A, 62B of the yoke, and comprises a body 105A, housing a cylinder 106A in which is slidably sealed a piston 108A which is connected to a piston rod 118A which is connected to the carriage 102.

The carriage 102 can be configured in any desired way but may, as indicated in the drawing, comprise a bar 130 supporting two blocks 132 and 134 through which openings 136 are bored for positioning on a shaft 70 which supports the roller 68. There are two plates 138A and 138B which enclose the carriage so that it is slidable, but fully contained by the two parallel bars 62A and 62B. Any desired method of fabrication such as welding or machining from a solid block, etc., can be provided as is well known in the art.

There is a compressional spring 122A inside of the cylinder 106A the purpose of which is to apply a small downward force to maintain the roller in its downward position at all times unless forced upwardly by the arm actuator 52A. There is an axial opening 121A in the piston which leads to a check valve 124A, which is pressed into a closed position by means of a helical spring 126A. The compression in the spring 126A is controlled by means of a coaxial screw 128 which is threaded into the axial opening in the piston rod 118A.

When the space 110 inside of the cylinder is filled with liquid and there is an upward force on the roller due to longitudinal movement of the arm actuator, there will be compression in the spring 122A and also compression in the liquid in the cylinder 106A, until the pressure in the liquid reaches a value such that it can force the seal ball 124A downwardly against the restraint of the spring and permit liquid to flow from the cylinder down through the opening 121A and into the cross-drilled holes 132 into a closed space 112A which is a sump. The ball 124A, seat, and spring 126A comprise an over-pressure valve. There is a conduit 114A including a shut-off valve 116A connected between the upper end of the cylinder 106A and the sump 112A. With the valve 116A closed, as the roller is forced upwardly it will be resisted by a compressional force in the liquid having a maximum value set by the compression in the spring 126A. This force will be maintained as long as the roller is pressed upwardly with a force of sufficient magnitude. If the arm actuator 50A is withdrawn, the roller would then be forced downwardly by the spring 122A but, because of the liquid seal, the piston could not be moved without drawing liquid back from the sump 112A through the conduit 114A and the valve 116A. Thus, to move the piston downwardly requires opening of the valve, so that liquid can be drawn from the sump through the conduit 114A into the space 110. Both the cylinder and sump are filled with liquid.

By adjusting the compression in the spring 126 by means of the screw 128, the amount of compression in the space 110 can be adjusted so as to maintain as firm a clamping of the wheel rim between the downwardly directed tooth from the body and the forward end of the arm.

Referring now to FIG. 4A there is shown a portion of the top of FIG. 4 with the substitution of a check valve 116B in place of the shut-off valve 116A. By use of the check valve, fluid can be automatically returned to the cylinder whenever the piston is permitted to move downward under the force of the spring 122.

It is thus clear that by use of the hydraulic apparatus indicated generally by the numeral 104A, a selectable force can be provided to clamp the wheel rim between the body tooth and the forward end of the arm. Whenever the arm actuator is withdrawn and the roller permitted to move downwardly under the force of the spring 122A, the arm can drop away from the rim and the tooth can be pulled from the inside of the rim, and moved to a new position around the wheel rim until the entire tire bead has been broken away from the wheel rim lip.

Figures 6, 7:
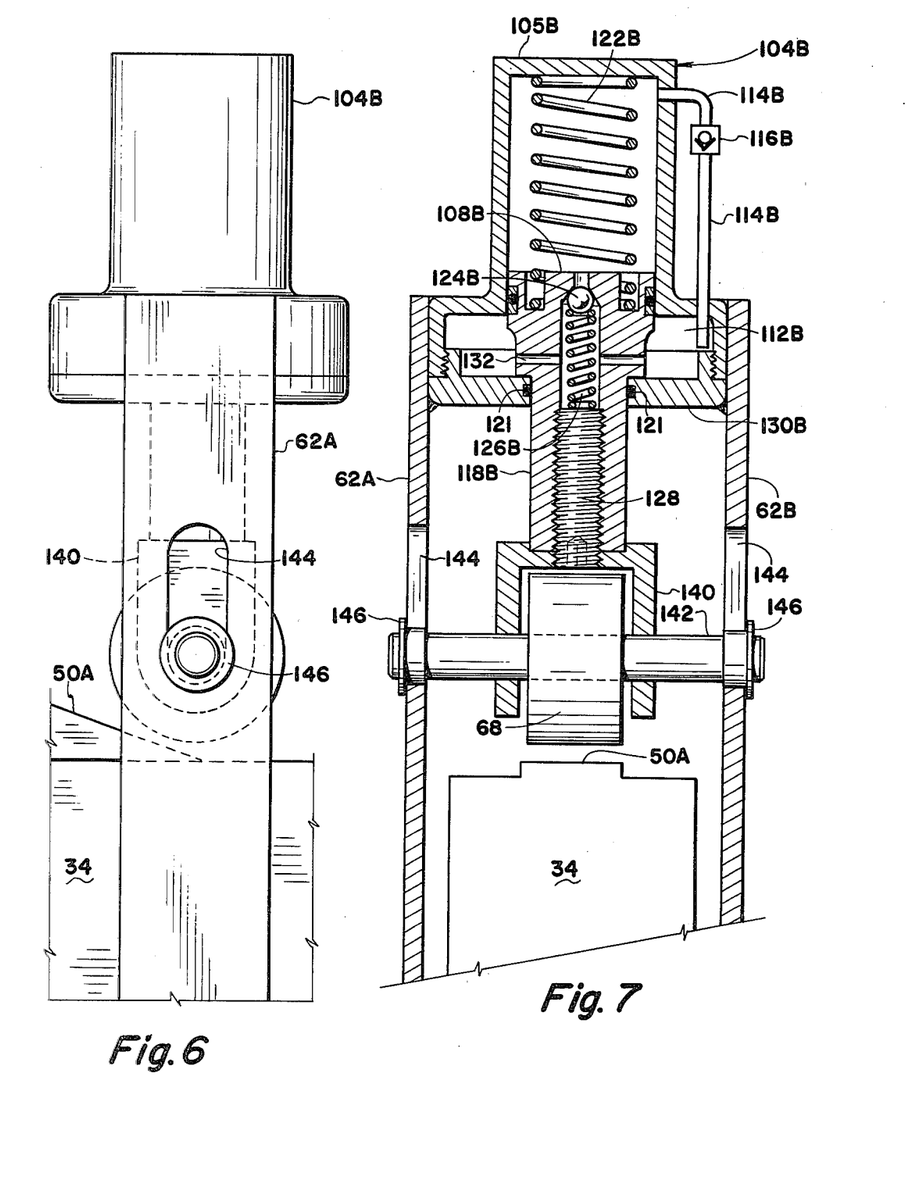
FIG. 6 illustrates a second embodiment of apparatus for holding the tool to the wheel rim.
FIGS. 7, 8 illustrate in two views a third embodiment of apparatus for holding the tool to the wheel rim.

Referring now to FIGS. 6 and 7, there are shown two views of a second embodiment of the hydraulic apparatus of this invention which is similar in most respects to that of FIG. 4 but has a different construction of carriage, by means of which the roller 68 can be lifted in the yoke, and carrying with it a piston rod as previously described. The piston rod 118B has fastened at its lower end a U-shaped yoke 140 having two transverse openings which through a shaft 142 can be inserted, supporting the roller 68 on the shaft inside of the yoke 140. The shaft 142 is long enough to extend outwardly through a pair of openings or slots 144 in the two bars 62A and 62B of the yoke. The shaft is locked so that it cannot move out of slots 144 and therefore as the arm actuator 150A moves its sloping surface into contact with the roller and lifts the roller, it is free to move upwardly pushing the piston upwardly into the cylinder 105B against the compression of the spring 122B. A similar type of over-pressure valve 124B is provided as in the case of FIG. 4 and the valve 116B is shown as a check valve, similar to that in FIG. 4A. In all other respects FIGS. 6 and 7 are similar to FIGS. 5 and 4 respectively, and need no further description.

Figure 8:
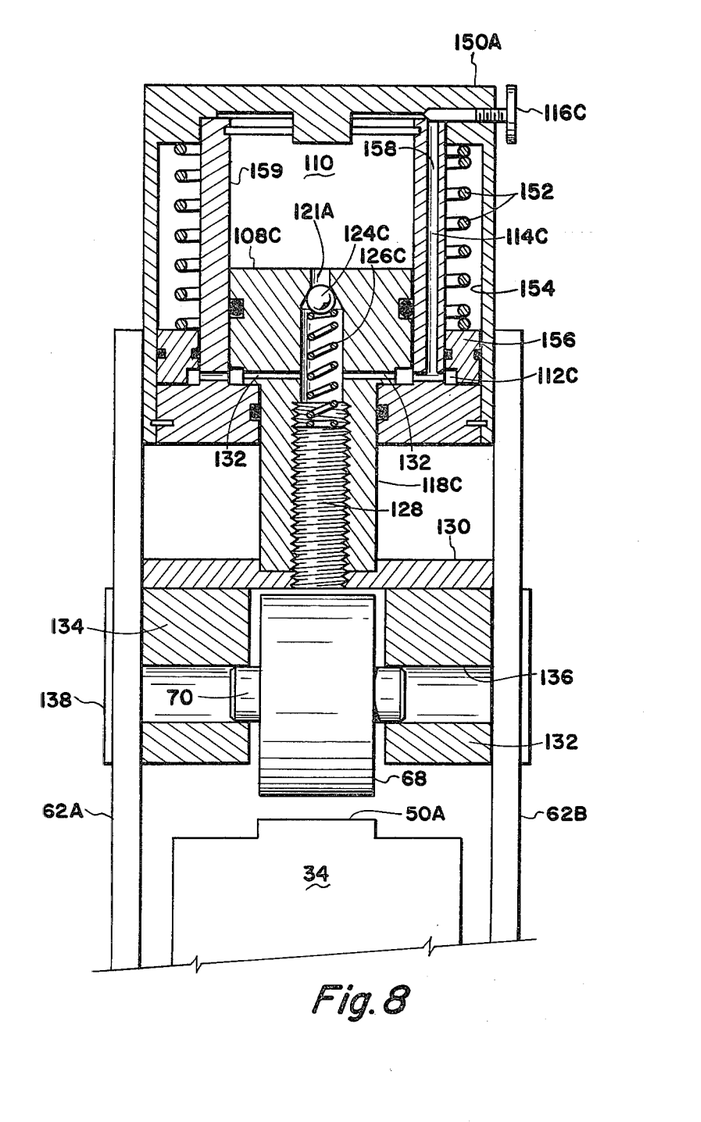

Referring now to FIG. 8 there is shown a third embodiment of the hydraulic apparatus of this invention. It is similar to FIGS. 4 and 7 in many respects including the cylinder, piston and piston rod and over-pressure valve shown in FIGS. 4 and 7. The piston rod is attached to a carriage identical to that of FIG. 4.

However, there is one major difference between FIG. 8 and FIG. 4, and that lies in the fact that there is no compressive spring inside the space 110 of the cylinder to force the piston downwardly as the roller becomes free to move downward. The same effect is obtained in a different way by providing a sump which is also a hydraulic cylinder 154. A piston 156 is slidably sealed into the annular cylinder 154 and there is a compressional helical spring 152 inside the cylinder 154 to maintain the piston 156 in its lowest position.

Consider the roller moving upwardly under the force of the arm actuator 50A and the valve 116C is closed. Pressure builds up in the liquid in the space 110 and as in the case of FIGS. 4 and 7 when the pressure of the liquid becomes greater than the force of the spring on the ball 124C, liquid then flows downwardly past the ball and into the slots 132 and into the cylinder 154, causing the piston 156 to move upwardly and to compress the spring 152. When the arm actuator is withdrawn and the roller 68 can move downwardly, the piston will not move until the valve 116C is opened and then the pressure of the spring 152 on the annular piston 156 forces it downwardly, and forces liquid from the sump 112C up through the passage 158 and back into the cylinder 159 and so on.

It will be clear that in place of the shut-off valve 116C, a check valve could be built into the conduit 158 in accordance with FIG. 7, for example.

Figure 9:
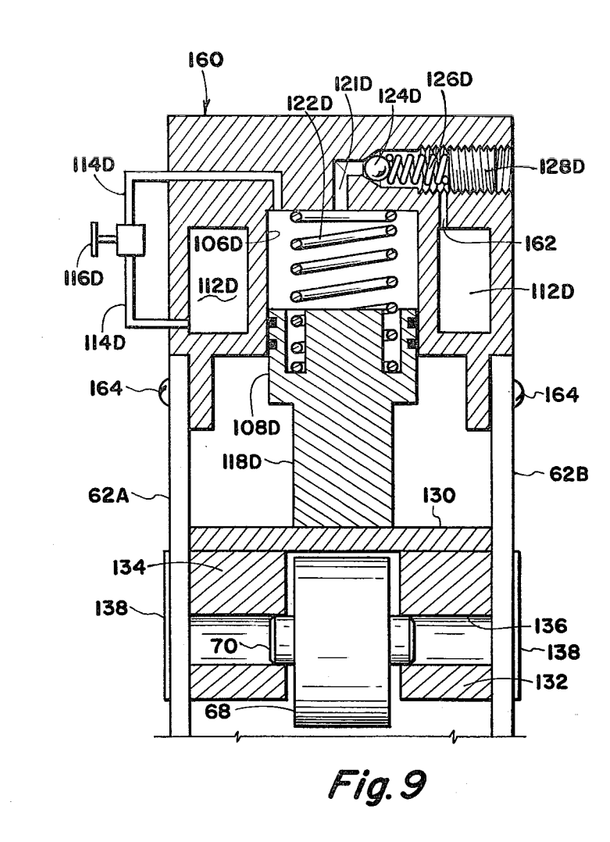
FIG. 9 illustrates a variation of FIG. 4.
Figure 10:
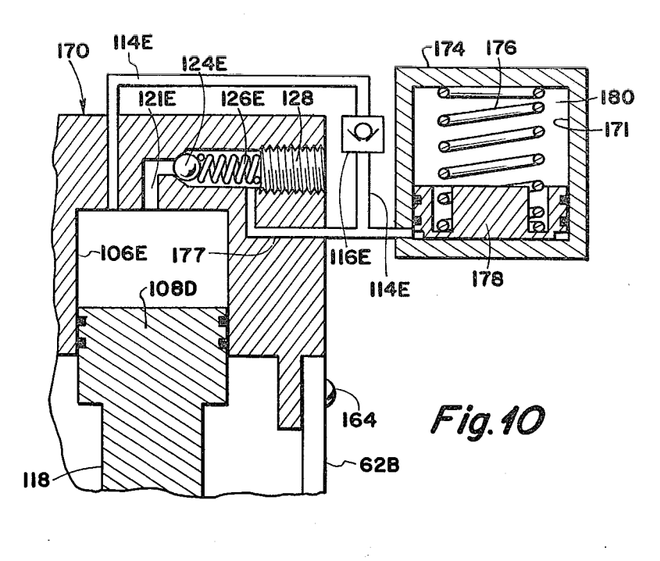
FIG. 10 illustrates a variation of FIG. 8.

Referring now to FIGS. 9 and 10 there is shown in FIG. 9 a variation of FIGS. 4, 7 and 8. In all of these prior FIGS. 4, 7 and 8 the over-pressure valve is shown as being mounted inside of the piston and piston rod. This is a very convenient position to place the over-pressure valve but it is not the only place in which it can be mounted. For example, in FIG. 9 the opening 121D and the valve ball 124D and spring 126D and adjustment screw 128D are all shown as being mounted in the cylinder block 160, rather than in the piston. The sump in this case is shown as an annular space within the cylinder block, surrounding the operating cylinder 106D thus FIG. 9 is similar in most respects to FIG. 4 except for the simplicity of the piston.

Another feature of this invention as shown in FIG. 8 involves a sump in the form of a cylinder with its own piston, without piston rod, but actuation by means of a compressive spring 152 inside of a second cylinder. In FIG. 8 this second cylinder was shown as an annular cylinder, which is convenient because of the symmetry of the device. However, as shown in FIG. 10, this is not an essential feature. FIG. 10 is similar to FIG. 9 in respect to the positioning of the over-pressure valve in the cylinder block and the sump cylinder is shown as a separate piece of apparatus. It comprises a body 174, containing a cylinder 171 with a sealed piston 178 adapted to slide upwardly under the force of compressed liquid forced into the bottom of the cylinder through the conduit 172. The piston will then rise against the restraining force of a compressive spring 176 similar to that of FIG. 8. The return of liquid from the sump is by means of the conduit 114E and check valve 116E and conduit 114E back to the cylinder 106E.

Thus, all of the embodiments shown in the figures from 4 to 10 comprise a hydraulic system which is adapted to provide a maximum restraining compressive force in a liquid between the piston and a cylinder, such that whenever the force on the piston gets greater than this value, liquid will bypass into a sump. Whenever the pressure becomes less than its maximum value the liquid will be returned from the sump back to the cylinder. In FIGS. 4 to 8 the hydraulic control is intimately tied up with the piston. In FIGS. 9 and 10 the hydraulic control is in a sense in the cylinder or auxiliary apparatus outside of the cylinder. However, these variations in design are examples of other variations that are possible, all of which are to be considered to be part of this invention and to be covered by the attached claims.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim, including the full range of equivalency to which each element thereof is entitled.

What is claimed is:

1. A tool for breaking the circumferential bead of a tire from the inward surface of the lip of a wheel rim, comprising:
   a body having a forward downwardly extending rim engaging tooth;
   a bead head slidably supported by said body;
   an arm pivotally supported to said body having an outer end configured to engage the exterior surface of the lip of a wheel rim;
   an arm actuator slidably supported by said body;
   means for longitudinally sliding said arm actuator to first pivot said arm to engage a wheel rim lip between said arm outer end and said body tooth and subsequently slidably advancing said bead head to engage the bead of a tire to force the bead away from the wheel rim lip; and
   hydraulic means interposed between said arm actuator and said arm for applying a selectable force to cause pivotal movement of said arm in response to the longitudinal movement of said arm actuator.

2. A tool according to claim 1 wherein said arm actuator is defined by an upper surface having a forward slope portion inclined upwardly and rearwardly and a connecting rearward planar portion; and including
   a yoke having said arm attached to its lower end; and
   means at the upper end of said yoke for engaging said arm actuator whereby formed movement of said arm actuator first pivots said arm upwardly by said upper surface sloped portion to engage a wheel rim lip and said upper surface planar portion retains said arm in engagement with the wheel rim lip as said arm actuator is further forwardly advanced to engage and move said bead head forward, said hydraulic means being interposed between said yoke upper end and said means for engaging said arm actuator.

3. A tool according to claim 2 wherein said yoke is in the form of paralleled bars extending to opposite sides of said body and wherein said hydraulic means comprises:
   a cylinder secured to the upper ends of said bars;
   a piston in said cylinder having means at the lower end for engagement with said arm actuator, the cylinder having hydraulic fluid therein, the cylinder having a fluid sump; and
   pressure controlled valve means for permitting fluid flow from said cylinder to said sump when the fluid pressure is at a preselected level as said piston is displaced in said cylinder to thereby apply a preselectable hydraulic pressure on said piston which thereby applies a preselected force on said arm as said arm actuator is longitudinally forwardly advanced.

4. A tool according to claim 2 including:

spring means urging said piston downwardly relative to said cylinder; and a bypass passageway from said cylinder above said piston and said sump; and valve means in said bypass passageway selectably controlling fluid flow between said sump and said cylinder.

5. A tool according to claim 4 in which said valve means is a manually controlled valve.

6. A tool according to claim 4 in which said valve means is a check valve resisting fluid flow from said cylinder to said sump but permitting fluid flow in the opposite direction.

7. The tool as in claim 3 in which said pressure control valve is in said piston.

* * * * *